United States Patent [19]

Wieting et al.

[11] Patent Number: 5,255,487

[45] Date of Patent: Oct. 26, 1993

[54] DOOR REINFORCEMENT TUBE

[75] Inventors: Ing E. Wieting, Ratingen; Ing J. Fischer, Mühlheim, both of Fed. Rep. of Germany

[73] Assignee: Mannesmann Aktiengesellschaft, Dusseldorf, Fed. Rep. of Germany

[21] Appl. No.: 744,298

[22] Filed: Aug. 13, 1991

[30] Foreign Application Priority Data

Aug. 17, 1990 [DE] Fed. Rep. of Germany ........ 4026459

[51] Int. Cl.$^5$ .................. E04C 3/30; B23P 13/00
[52] U.S. Cl. .................... 52/728; 296/188; 428/683
[58] Field of Search ............... 52/727, 728, 730, 736, 52/793; 296/188, 146 R, 146 C; 138/37, 172; 428/683, 586

[56] References Cited

U.S. PATENT DOCUMENTS

| 766,280 | 8/1904 | O'Shea | 52/736 |
| 773,298 | 10/1904 | Shock | 52/736 |
| 2,710,677 | 6/1955 | Ferris | 138/172 |
| 3,464,450 | 9/1969 | Steffenini | 138/172 |
| 3,894,325 | 7/1975 | Maruta et al | 428/683 |
| 3,936,278 | 2/1976 | Moens | 52/736 |
| 4,978,562 | 12/1990 | Wycech | 296/146 |
| 5,093,990 | 3/1992 | Klippel | 296/188 |

FOREIGN PATENT DOCUMENTS

| 3011345 | 10/1981 | Fed. Rep. of Germany ...... 296/188 |
| 3610481 | 10/1987 | Fed. Rep. of Germany . |
| 3728476C1 | 6/1989 | Fed. Rep. of Germany . |
| 3606024C2 | 12/1989 | Fed. Rep. of Germany . |

Primary Examiner—Carl D. Friedman
Assistant Examiner—Christopher T. Kent
Attorney, Agent, or Firm—Cohen, Pontani, Lieberman & Pavane

[57] ABSTRACT

A door reinforcement beam for use in passenger vehicles capable of absorbing lateral impacts includes: a base tube made of a metal having a high degree of strength, toughness and capacity for deformation work and a reinforcing section being disposed and attached to the central portion of the base tube so as to further enhance the door reinforcement's capacity to absorb impact energy.

9 Claims, 2 Drawing Sheets

DOOR REINFORCEMENT TUBE

FIELD OF THE INVENTION

The present invention relates to a door reinforcement bean being composed of metal having a high degree of strength, toughness and capacity for deformation work so as to absorb lateral impacts in passenger cars.

BACKGROUND OF THE INVENTION

Door reinforcement beams serve as stiffeners for automobile doors by absorbing impact energy in the event of a lateral impact and to convert impact energy into mechanical work. In this manner, passengers in a car can be protected from injury. For such a door reinforcement to perform this safety function, the following values, for instance, must be satisfied:

Tensile strength Rm at least 1,100 N/mm$^2$
Elastic limit Rt at least 800 N/mm$^2$
Elongation at rupture A5 at least 8% or a work capacity W-150 of at least 1,900 Joules, depending on the dimensions of the section.

These minimum requirements can be lower or higher depending on the specification of the automobile manufacturer.

The work capacity of a door reinforcement beam can be tested by subjecting it to a bending of 150 mm in a 3-point bending test. The force applied is recorded with respect to the bending distance and the area below the curve is determined. This integral then gives the desired work capacity.

Since the door reinforcement should be suitable for installation in small cars having narrow doors, it is necessary that its dimensions be kept as small as possible. Furthermore, it is necessary that the total weight of the car be only minimally increased by the installation of the door reinforcement.

A door reinforcement beam of this type is known from Federal Republic of Germany Patent 36 06 024. The rectangular, preferably square, hollow section with bead portions which extend outward at both ends on the inner and outer flanges is an extended section of light metal. One particular embodiment as shown in FIG. 9 of the above referred patent is characterized by the fact that the central region of the impact beam is reinforced over a given length by a length of pipe arranged within it. This proposal, however, has the disadvantage that when light metal is used, the wall thicknesses of the section must be very large in order to obtain the desired work capacity. Furthermore, such a section is poorly adaptable to maneuvering around obstacles in an area of installation within the door. Furthermore, an expensive extrusion tool must be used with the section and once the tool has been selected for use with the section, it can no longer be used in the event of a structural change in the door or upon a change in the model.

An alternative solution can be noted from Federal Republic of Germany Patent 37 28 476 in which the values for the tensile strength and elastic limit of a door reinforcement tube are increased, as compared with the above-indicated prior art, by the use of a special steel alloy. This alternative however, has the disadvantage that the strength increasing effect is achieved only by alloying expensive elements such as nickel and molybdenum.

SUMMARY OF THE INVENTION

An object of the present invention is to develop a door reinforcement beam which, with the use of a low-price steel alloy and while satisfying the required mechanical values, is of low weight and can easily be adapted to different door designs.

In the proposed door reinforcement beam, use is made of the discovery that work capacity is dependent, inter alia, on the value of the moment of resistance of the structural part. Since the test for determining the work capacity corresponds approximately to the stressing of a freely lying beam with a load acting on its center, the critical cross section for failure of the structural part lies at its center. In accordance with known equations for static bending tests on a beam shaped as tube, the deflection f is inversely proportional to the fourth power of the outside diameter with a reduction factor depending on the ratio of the diameter to the wall thickness. In order to make optimal use of this known relationship with respect to a door reinforcement tube, it is proposed that the critical central region of the door reinforcement be reinforced specifically against bending and/or kinking. It is, therefore, proposed to attach to a base tube a length of tube which is inserted within the base tube or pushed over its outside surface and over a given length. A means for attachment to the base tube or beam is necessary for the reinforcing part to be fixed in position to the base tube. One must distinguish, however, between material-locked attachments (for instance, bonding soldering, welding), form-locked attachments (for instance, riveting), and force-locked attachments (for instance, shrinking). With respect to welding techniques, spot welding, projection welding, laser welding or capacitor-discharge welding can be used. As an alternative, a slit tube can also be used, the size of which is so selected that when it is placed over or inserted into the base tube, a clamping action is achieved and special fastening in position is generally not necessary. However, in order to be certain that the slit tube will not loosen even after prolonged use, it is additionally advisable to fix the slit tube in position by form-locking or material-locking means. This is also true if a variant, such as a shrink-on length of tube is used.

In accordance with another feature of the invention, the reinforcement beam is developed as a separate length of a tube which is attached to the sections of the base tube adjoining in on both sides. The equalizing of the wall thicknessees in the region of the attachment can be effected either by stretching the ends of the thickened section or by bulging the ends of the lengths of the adjoining base tube. As a manner of attachment, friction welding may be advantageously employed since in this manner different materials can be attached to each other in a simple manner and within short cycle times.

Furthermore, it is also proposed to produce the door reinforcement directly from the base tube in the form of a section of thickened wall. This has the advantage that the transition from the base tube to the thickened region is continuous and no sudden changes in the cross section can occur. For optimizing the weight, it is particularly advantageous for the base tube to be developed, as a whole, as a beam of identical bending stress under the assumption that a single load acts centrally and a given deflection is permissible. This design has the advantage that within each cross-sectional plane the wall is only as thick as is necessary in order to take up the load. Such a thickening which extends over a given length, regardless of whether the thickening extends radially outward or inward or is distributed uniformly towards the outside and the inside, can be produced by different methods. One of the possibilities consists, for instance, of drawing with a stepped mandrel (Federal Republic of Germany 30 21 482), or of non-cutting shaping, such as pressing, rolling or hammering (Federal Republic of Germany 36 10 481), if necessary, in combination with cutting shaping. The advantage of integral thickening over placing lengths of tube on the outside or on the inside is that the reinforcement can be shifted, in a more focussed manner radially more towards the outside or more towards the inside with regard to the permissible maximum outside dimension, the weight of the structural part, and the size of the load-bearing cross section. In addition, the length of the thickened section can also be freely selected.

Another possibility for reinforcing the central region of the base tube is to provide the tube with single layer or multi-layer wrapping. This wrapping can consist of wires or strips of metal or high-strength fibers of plastics such as, for instance, aramid fibers. This last-mentioned variant, has the advantage that considerable weight can be saved and that the wrapping technique is very simple. The reinforcing action is particularly good if the wires, strips or fibers are wound under tension. In the case of plastic fibers, there is also the added possibility of embedding the fibers in a hardenable composition which surrounds them, for instance epoxy resin.

All the above embodiments of the invention, have the advantage that the door reinforcement is of a larger cross section only in the critical central region while the cross sections in the adjoining regions are smaller so that the total weight of the structural part is less than comparable door reinforcements. Thus, the door reinforcement can be obtained by a simple manner of manufacture without the need for using expensive alloy material or undergoing expensive manufacturing processes, such as, for instance, additional heat treatment.

The reinforcing action can be further increased, if for instance, the inside of the reinforced region is filled with foam. Mixtures of substances for such reinforcing foams can be noted, for instance, from U.S. Pat. No. 4,861,097. As an alternative, a stiffening element such as a tensile spring or a steel strip twisted around the neutral fiber can be arranged within the reinforced region. These last-mentioned stiffening elements are placed helically against the inner wall of the reinforced region and thus increase the resistance of the critical central region against kinking. In accordance with yet another feature of the invention, the stiffening element is a rectangular hollow section wherein the long side of the element lies in the direction of expected impact.

In the event that tube lengths or slit-tube lengths are used, there is a further advantageous aspect. Recognizing that the base tube is much longer than the reinforcement region and in order to keep the cost of the material for the base tube low, a simple commercial steel can be used, such as, for instance, St.52. In order to specifically strengthen the critical central region, the section of the tube which is placed on or in the base tube or else welded therein has a higher strength and/or toughness than that of the base tube. The better mechanical values can be achieved by the selection of a specific material, for example, by the alloying of specific elements or by a combination of specific shaping and proper heat treatment. Yet another possibility is to harden the surface of the length of tube, for instance by case hardening or nitrogenizing.

BRIEF DESCRIPTION OF THE DRAWINGS

Some embodiments of the door reinforcement beam of the present invention will be explained further with reference to the drawings, in which.

DETAILED DESCRIPTION OF THE PRESENTLY PREFERRED EMBODIMENTS

Figure 1:
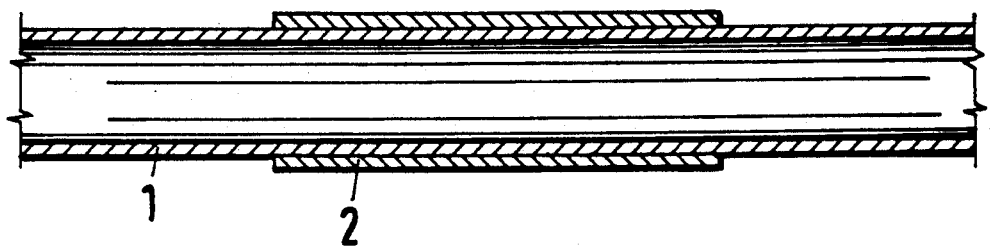
FIG. 1 shows a longitudinal section of a first embodiment wherein an outer tube is placed on the outside of a base tube.

FIG. 1 shows in a longitudinal section a first embodiment of the door reinforcement beam of the present invention having a base tube 1 and a tube length 2 pushed thereover. This outer tube section 2 serves to reinforce the critical central region of the base tube 1. The manner of the attachment of the outer tube section 2 has been described in detail above and need not be repeated here.

Figure 2:
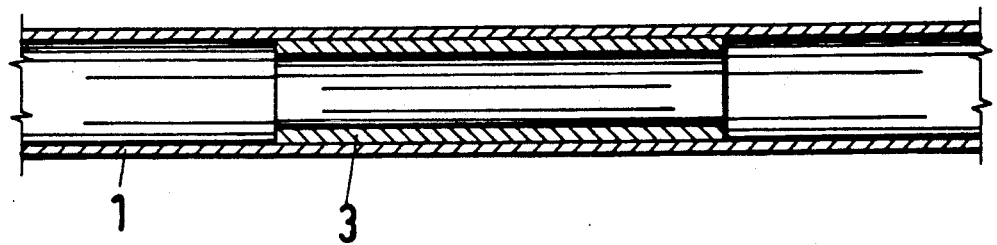
FIG. 2 shows a longitudinal section of a second embodiment wherein a tube is inserted inside the base tube.

A modification of this embodiment is shown in FIG. 2, wherein a reinforcing tube section 3 is inserted into the base tube 1. In yet another variation, an outer tube 2 can be placed on the outside of the base tube while an inner tube 3 can be inserted in the interior of the base tube. These possibilities are also present and applicable in the case wherein a clamping slit tube is used on the outside and/or inside of the base tube 1.

Figure 3:
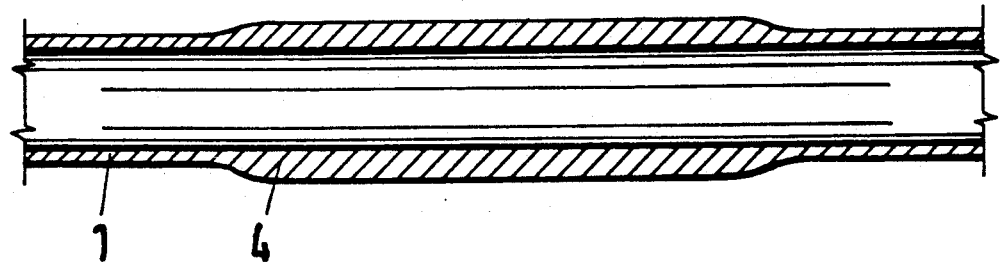
FIG. 3 shows a longitudinal section of a door reinforcement beam with an integral reinforcement section.
Figure 6:
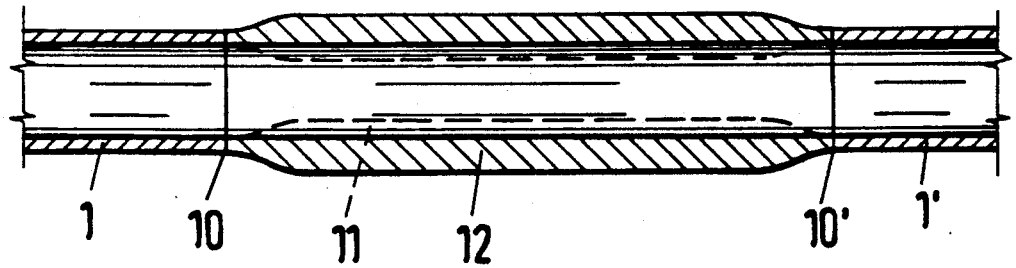
FIG. 6 shows a longitudinal section of door reinforcement beam similar to FIG. 3, but wherein a reinforcing part has been welded thereto.

FIG. 3 shows, in a longitudinal section, yet another embodiment, wherein the reinforced critical central section 4 is an integral component of the base tube 1. This design has the advantage that within each cross-sectional plane the wall is only as thick as is necessary in order to take up the load. With reference to FIG. 6, it may also be mentioned that the wall thickening can also be located entirely or partially on the inside of the base tube 1.

Figure 4:
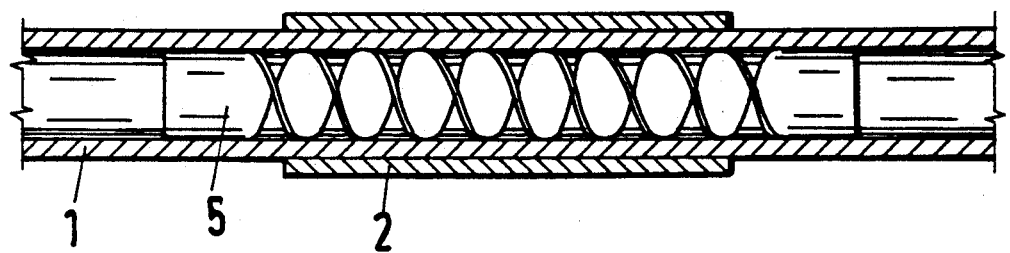
FIG. 4 shows a longitudinal section of a door reinforcement beam similar to FIG. 1 but with an added stiffening element in the form of a steel strip in the interior of the base tube.

FIG. 4 is comparable to the embodiment shown in FIG. 1, with the mere difference that, in addition, a helical steel strip 5 is disposed within the reinforced region. This steel strip serves to further stiffen the central region of the base tube 1.

Figure 5:
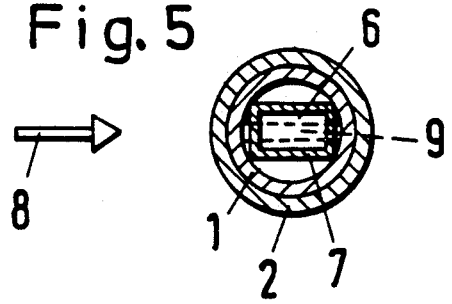
FIG. 5 shows a cross-sectional view of an arrangement of an additional stiffening element in the form of a hollow rectangular section or alternatively a web plate.

FIG. 5 shows a cross sectional view of an alternative embodiment wherein a rectangular hollow section 6 is disposed within base tube 1 and long side 7 of the rectangular section which lies in the direction of expected impact as indicated by arrow 8. The added weight from the stiffening element is relatively slifht since the wall thickness of the stiffening element 6 can be kept small. In addition, it is also possible to provide a web plate 9 (shown here in dashed line), which is even more favorable from the standpoint of weight than the hollow section 6.

The embodiment shown in FIG. 6, is comparable to FIG. 3, wherein there is a reinforcing part 12 which is attached to the base-tube sections 1, 1' by two weld seams 10, 10'. The connecting seams 10, 10' can, for example, be seams produced by friction welding. The dashed line 11 shown along reinforced part 12 is intended to indicate that, as an alternative, the reinforcing wall thickness can also be disposed entirely or only partially on the inside of the base tube 1. The smoothing of the wall in the region of attachment can be achieved by deforming the ends of the reinforcing part 12 or, as an alternative, by bulging the ends of the two base-tube sections 1, 1'.

What is claimed is:

1. A hollow reinforcement beam having a high degree of stiffness for absorbing lateral impact in a passenger car door, comprising:
   (a) a hollow base tube having ends, a length, a longitudinal bore, a central portion spaced from the ends, and an interior and exterior surface, said base tube being composed of steel; and
   (b) a tubular reinforcing section composed of a steel having a higher strength, toughness, and capacity for deformation work than the steel of the base tube being attached to said exterior surface and extending along said central portion only of said base tube.

2. The reinforcement beam according to claim 1, wherein said tubular reinforcing section is a slit tube.

3. The reinforcement beam according to claim 1, where in said reinforcing section has a pair of ends, said reinforcing section being an integral part of said base tube so that the ends of said reinforcing section make a smooth transition with the exterior surface of said base tube.

4. The reinforcement beam according to claim 3, wherein said base tube has a uniformly distributed bending strength.

5. The reinforcement beam according to claim 1, further comprising a foamed portion within said bore and within said central portion, and in contact with the interior surface of said base tube.

6. The reinforcement beam according to claim 1, further comprising means for stiffening said beam within said reinforcing section, said stiffening means being in contact with said interior surface.

7. The reinforcement beam according to claim 6, wherein said stiffening means has a longitudinal axis and comprises a steel strip helically twisted about said axis.

8. The reinforcement beam according to claim 6, wherein said impact has a direction and said tubular reinforcing section has a rectangular cross-section having relatively longer sides and relatively shorter sides, said relatively longer sides being parallel to the direction of impact.

9. The reinforcement beam according to claim 1, wherein said reinforcing section is connected to said base tube by a friction weld seam.

* * * * *